United States Patent
Yamamoto et al.

(10) Patent No.: US 12,537,729 B2
(45) Date of Patent: Jan. 27, 2026

(54) RECEIVER CIRCUIT AND METHOD

(71) Applicant: Kioxia Corporation, Tokyo (JP)

(72) Inventors: Takaya Yamamoto, Taito Tokyo (JP); Shinsuke Fujii, Fujisawa Kanagawa (JP)

(73) Assignee: KIOXIA CORPORATION, Tokyo (JP)

( * ) Notice: Subject to any disclaimer, the term of this patent is extended or adjusted under 35 U.S.C. 154(b) by 42 days.

(21) Appl. No.: 18/591,530

(22) Filed: Feb. 29, 2024

(65) Prior Publication Data

US 2024/0323066 A1    Sep. 26, 2024

(30) Foreign Application Priority Data

Mar. 24, 2023 (JP) .................................. 2023-048312

(51) Int. Cl.
*H04L 27/01* (2006.01)

(52) U.S. Cl.
CPC .................... *H04L 27/01* (2013.01)

(58) Field of Classification Search
CPC ......................... H04L 25/4917; H04L 27/01
See application file for complete search history.

(56) References Cited

U.S. PATENT DOCUMENTS

| | | | |
|---|---|---|---|
| 7,126,378 B2 | 10/2006 | Stojanovic et al. | |
| 7,433,397 B2 | 10/2008 | Garlepp et al. | |
| 10,103,870 B2* | 10/2018 | Shibasaki | H03L 7/091 |
| 10,666,466 B2 | 5/2020 | Satoh et al. | |
| 2006/0233291 A1 | 10/2006 | Garlepp et al. | |
| 2023/0120821 A1* | 4/2023 | Rie | G11C 5/063 |
| | | | 365/207 |
| 2024/0333563 A1* | 10/2024 | Pandita | H04B 1/38 |
| 2025/0119138 A1* | 4/2025 | Park | H03K 3/037 |

FOREIGN PATENT DOCUMENTS

| | | |
|---|---|---|
| JP | 4718451 B2 | 7/2011 |
| JP | 2020-048060 A | 3/2020 |
| JP | 6912702 B2 | 8/2021 |

* cited by examiner

*Primary Examiner* — Dac V Ha
(74) *Attorney, Agent, or Firm* — Foley & Lardner LLP

(57) ABSTRACT

A receiver circuit includes an equalizer configured to process a received signal; a first offset circuit configured to apply a first offset voltage to the processed signal, the first offset voltage having a first polarity; a second offset circuit configured to apply a second offset voltage to the processed signal, the second offset voltage having a second polarity opposite to the first polarity; a first amplification circuit configured to amplify a first output signal provided by the first offset circuit; a second amplification circuit configured to amplify a second output signal provided by the second offset circuit; and a third amplification circuit configured to amplify the processed signal.

16 Claims, 17 Drawing Sheets

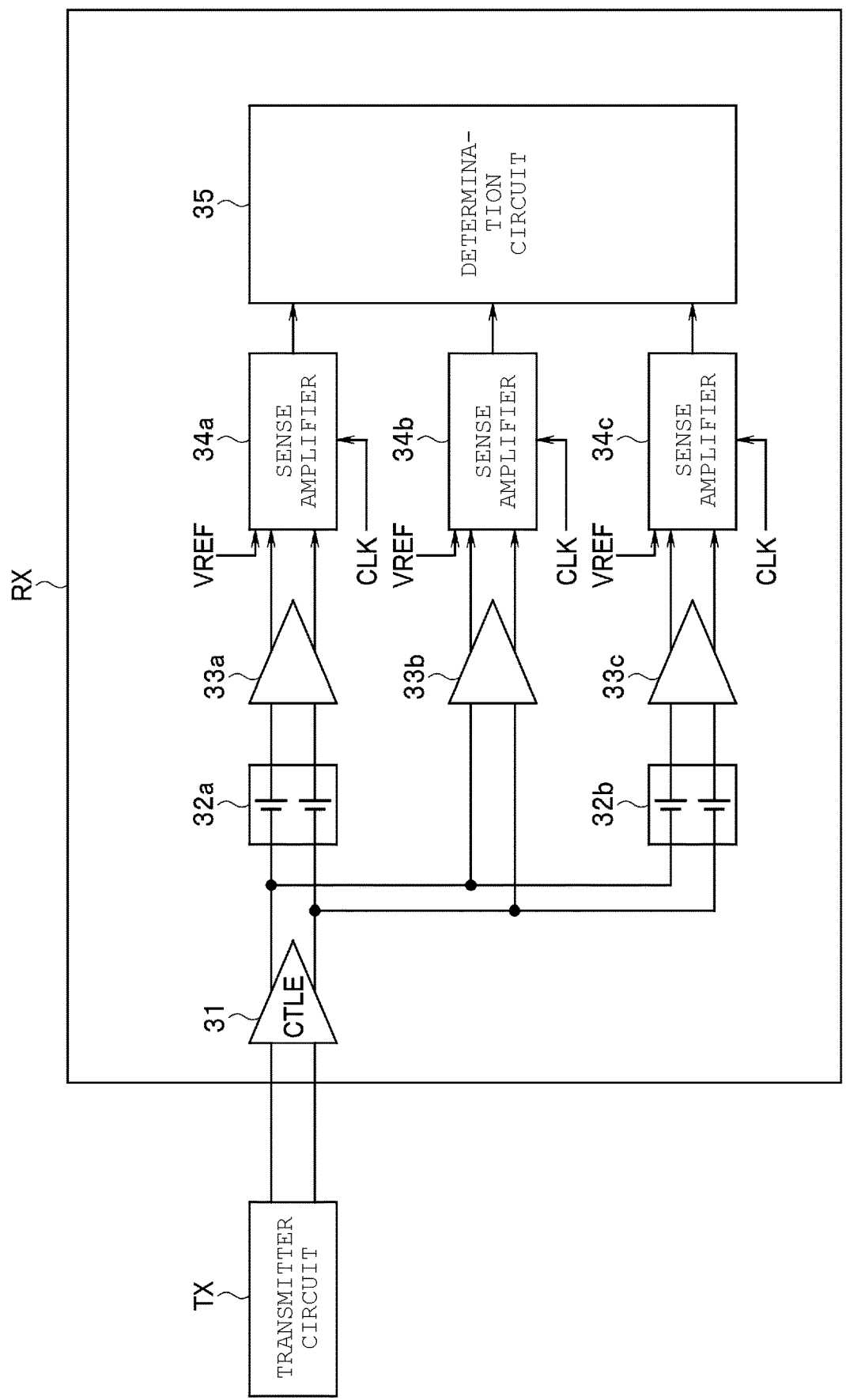

RECEIVER CIRCUIT AND METHOD

CROSS-REFERENCE TO RELATED APPLICATION(S)

This application is based upon and claims the benefit of priority from Japanese Patent Application No. 2023-048312, filed Mar. 24, 2023, the entire contents of which are incorporated herein by reference.

FIELD

Embodiments described herein relate generally to a receiver circuit and a method.

BACKGROUND

The semiconductor integrated circuit can receive a signal and restore data from the signal. Here, it is desired that the semiconductor integrated circuit appropriately restores data from the signal.

DESCRIPTION OF THE DRAWINGS

FIG. 4 is a block diagram illustrating an example of a configuration of a receiver circuit according to a first embodiment;

DETAILED DESCRIPTION

Embodiments provide a receiver circuit and a method that can appropriately restore data from a signal.

In general, according to one embodiment, a receiver circuit is disclosed. The receiver circuit includes an equalizer configured to process a received signal; a first offset circuit configured to apply a first offset voltage to the processed signal, the first offset voltage having a first polarity; a second offset circuit configured to apply a second offset voltage to the processed signal, the second offset voltage having a second polarity opposite to the first polarity; a first amplification circuit configured to amplify a first output signal provided by the first offset circuit; a second amplification circuit configured to amplify a second output signal provided by the second offset circuit; and a third amplification circuit configured to amplify the processed signal.

Hereinafter, embodiments will be described in detail with reference to the drawings.

First Embodiment

Memory System Configuration

Figure 1:
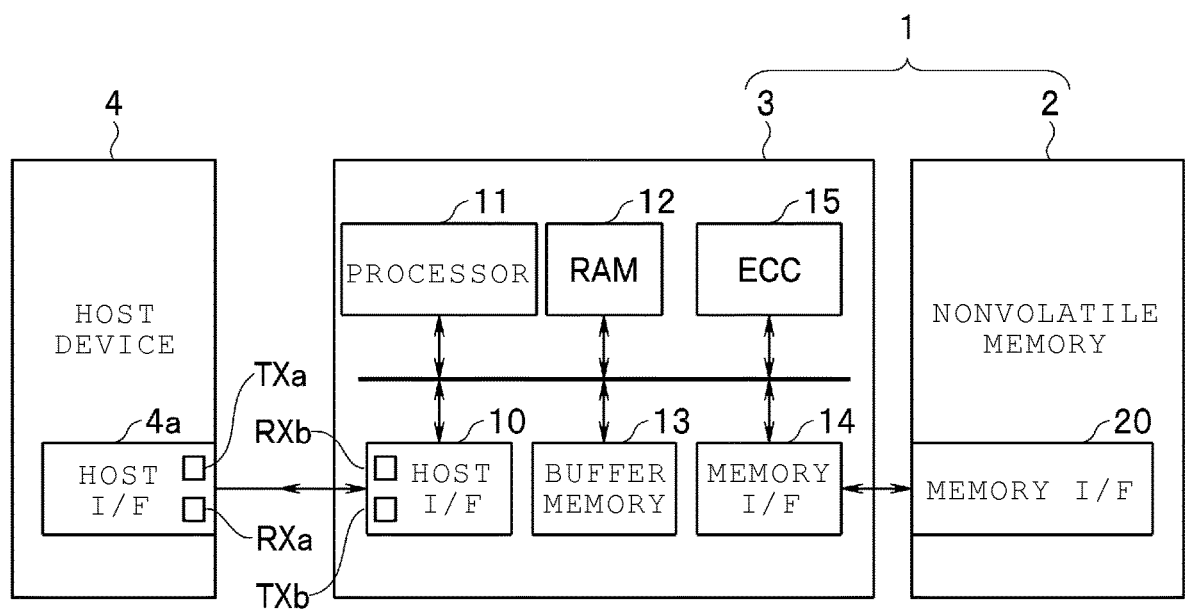
FIG. 1 is a block diagram illustrating an example of a configuration of a memory system.

FIG. 1 is a block diagram illustrating an example of the configuration of the memory system. A memory system 1 of the embodiment includes a memory controller 3 and a nonvolatile memory 2. The nonvolatile memory 2 may include a plurality of memory chips. The memory system 1 is connectable to a host device 4.

The host device 4 is, for example, an electronic device such as a personal computer or a mobile terminal. The host device 4 includes a host interface (host I/F) circuit 4a. The host I/F circuit 4a includes a transmitter circuit TXa and a receiver circuit RXa.

The memory system 1 may be provided by mounting a plurality of chips configuring the memory system 1 on a motherboard provided in the host device 4, or may be configured as a system large-scale integrated circuit (LSI) or a system-on-a-chip (SoC) that implements the memory system 1 with one module. Examples of the memory system 1 include a memory card such as an SD card, a solid-state-drive (SSD), an embedded-multi-media-card (eMMC), and the like.

The nonvolatile memory 2 is a NAND flash memory including a plurality of memory cells, and stores data in a nonvolatile manner.

The memory controller 3 instructs the nonvolatile memory 2 to write (also referred to as program), read, erase, and the like in response to a command from the host device 4, for example. The memory controller 3 manages a memory space of the nonvolatile memory 2. The memory controller 3 includes a host interface (host I/F) circuit 10, a processor 11, a random access memory (RAM) 12, a buffer memory 13, a memory interface (memory I/F) circuit 14, an error checking and correcting (ECC) circuit 15, and the like. The memory controller 3 is an example of the semiconductor integrated circuit.

The host I/F circuit 10 is connected to the host device 4 via a host bus, and performs interface processing with the host device 4. The host I/F circuit 10 transmits and receives a command, an address, and data to and from the host device 4.

The host I/F circuit 10 includes a transmitter circuit TXb and a receiver circuit RXb. The transmitter circuit TXb transmits data to the receiver circuit RXa of the host device 4. The receiver circuit RXb receives data transmitted from the transmitter circuit TXa of the host device 4.

Since the transmitter circuits TXa and TXb have the same configuration, the transmitter circuits TXa and TXb may be referred to as transmitter circuit TX in the following description. Since the receiver circuits RXa and RXb have the same configuration, the receiver circuits RXa and RXb may be referred to as receiver circuit RX in the following description.

The transmitter circuit TX and the receiver circuit RX are provided in the host I/F circuit 4a of the host device 4 and the host I/F circuit 10 of the memory controller 3, but are not limited to such a configuration. The transmitter circuit TX and receiver circuit RX of the embodiment may also be applied to other interface circuits that perform high-speed communication. For example, the transmitter circuit TX and receiver circuit RX may be provided in the memory I/F circuit 14.

The processor 11 is configured as, for example, a central processing unit (CPU). The processor 11 controls overall operation of the memory controller 3. For example, when receiving a write command from the host device 4, the processor 11 issues a write command corresponding to the write command from the host device 4 to the nonvolatile memory 2 via the memory I/F circuit 14. The same applies to when receiving a read command and an erase command. The processor 11 executes various processes for managing the nonvolatile memory 2, such as wear-leveling.

The RAM 12 is used as a work area for the processor 11, and stores firmware data loaded from the nonvolatile memory 2, various tables created by the processor 11, and the like. The RAM 12 is configured as, for example, DRAM or SRAM.

The buffer memory 13 temporarily stores data transmitted from the host device 4, and also temporarily stores data transmitted from the nonvolatile memory 2.

The memory I/F circuit 14 is connected to the nonvolatile memory 2 via a bus, and performs interface processing with the nonvolatile memory 2. The memory I/F circuit 14 transmits and receives a command, an address, and data to and from the nonvolatile memory 2.

During writing of data, the ECC circuit 15 generates an error correction code for write data, adds the error correction code to the write data, and sends the write data to the memory I/F circuit 14. During reading of data, the ECC circuit 15 performs error detection and/or error correction on read data using an error correction code provided in the read data. The ECC circuit 15 may be provided in the memory I/F circuit 14.

Configuration of Receiver Circuit Before describing the configuration of the receiver circuit RX of the embodiment, a configuration of a receiver circuit RXc of a comparative example will be described.

Figure 2:
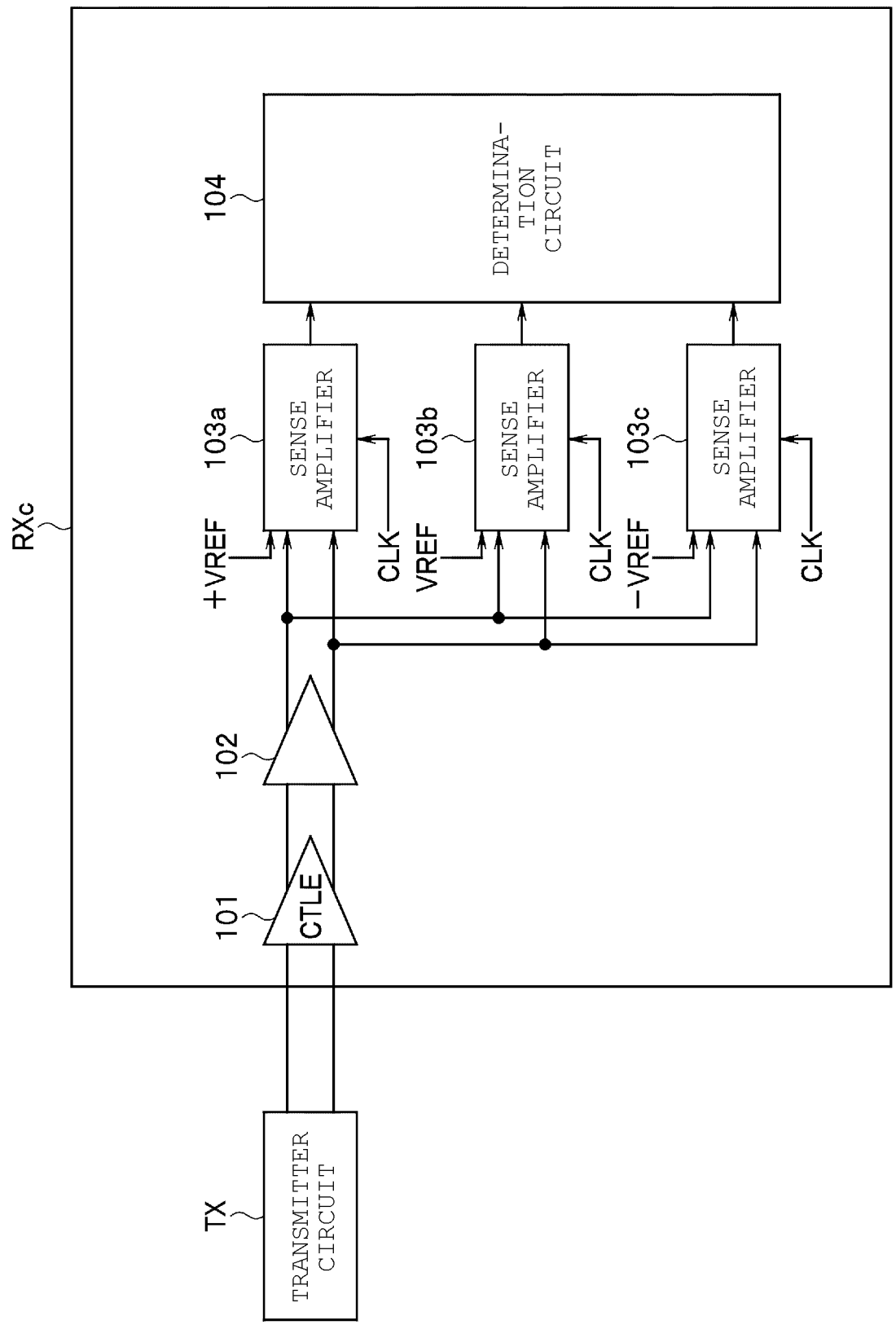
FIG. 2 is a block diagram illustrating an example of a configuration of a receiver circuit of a comparative example.

FIG. 2 is a block diagram illustrating an example of the configuration of the receiver circuit of the comparative example.

The receiver circuit RXc includes a continuous time linear equalizer (CTLE) circuit 101, an amplification circuit 102, three sense amplifiers 103a to 103c, and a determination circuit 104.

The CTLE circuit 101 receives a differential PAM4 signal (referred to as a received signal in the following description) from the transmitter circuit TX. The PAM4 signal transmits 2 bits (4 values) of data per time slot by converting a voltage direction into multiple values to increase a data rate. In other words, the PAM4 signal transmits data of 2 bits (4 values) per time slot by converting a voltage direction into multiple values or by utilizing 4-level voltage amplitude to increase a data rate. In the embodiment, the PAM4 signal will be described as an example, but is not limited thereto. The embodiment is applicable to, for example, PAM8 which transmits 3 bits (8 values) of data per time slot, or PAM16 which transmits 4 bits (16 values) of data per time slot.

The CTLE circuit 101 performs various signal processing such as equalizing processing on the received signal, and outputs the received signal subjected to the signal processing to the amplification circuit 102. The CTLE circuit 101 compensates for loss occurring in a transmission path using, for example, a high-pass filter, and reduces jitter for the received signal.

The amplification circuit 102 amplifies the received signal output from the CTLE circuit 101 and outputs the amplified received signal to the sense amplifiers 103a to 103c.

The sense amplifier 103a compares the received signal amplified by the amplification circuit 102 with a threshold voltage +VREF in synchronization with a clock signal CLK, and outputs the comparison result to the determination circuit 104.

The sense amplifier 103b compares the received signal amplified by the amplification circuit 102 with a threshold voltage VREF in synchronization with the clock signal CLK, and outputs the comparison result to the determination circuit 104. The sense amplifier 103c compares the received signal amplified by the amplification circuit 102 with a threshold voltage −VREF in synchronization with the clock signal CLK, and outputs the comparison result to the determination circuit 104.

The threshold voltage VREF is a reference voltage (0 V). The threshold voltage +VREF is a voltage larger than the threshold voltage VREF. The threshold voltage −VREF is a voltage smaller than the threshold voltage VREF.

The determination circuit 104 determines a value of transmitted data based on the comparison results of the sense amplifiers 103a to 103c. More specifically, the determination circuit 104 determines whether a bit pattern of the transmitted data is one of four values of "00", "01", "10", and "11" based on the comparison results of the sense amplifiers 103a to 103c.

Figure 3:
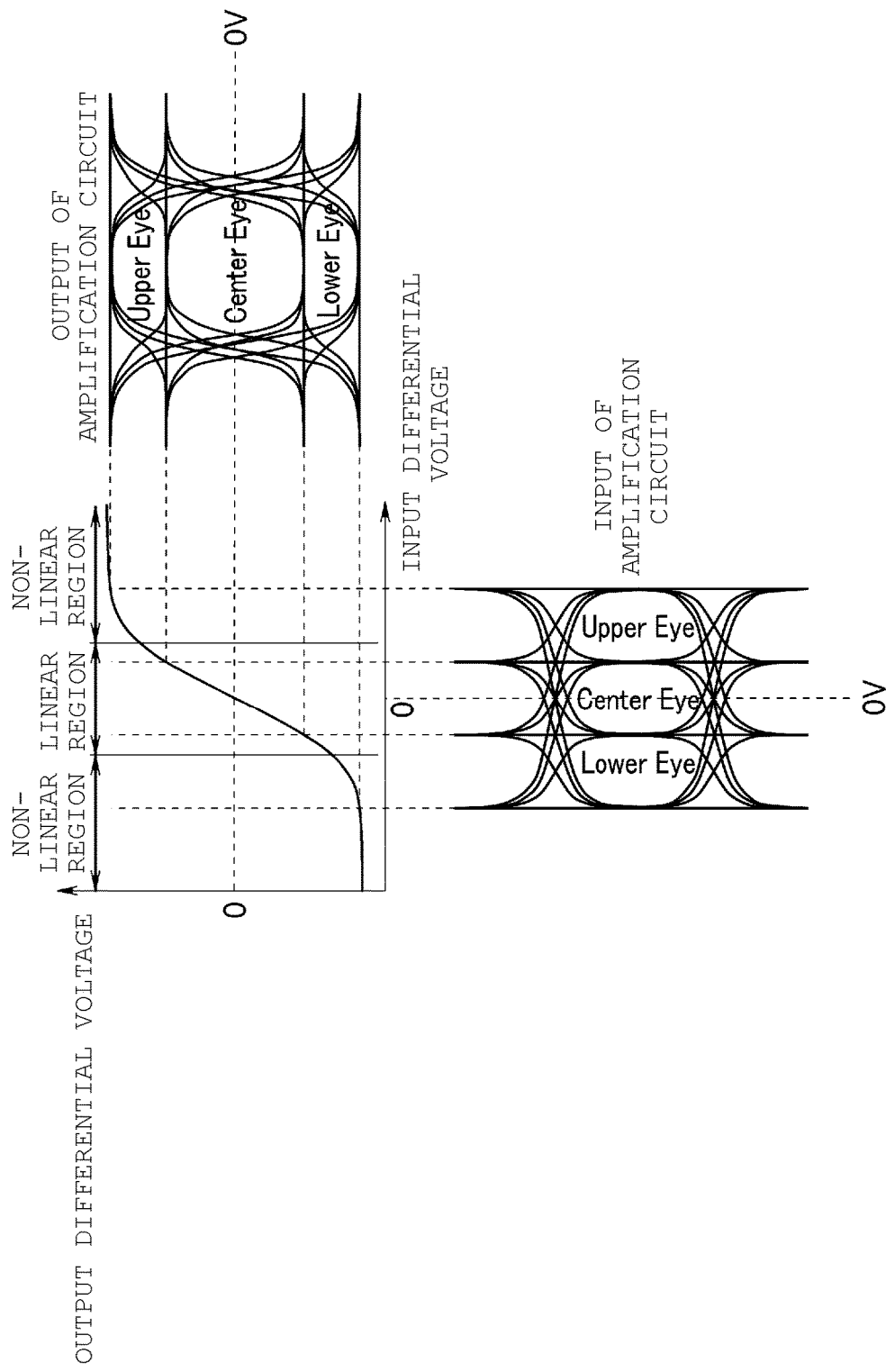
FIG. 3 is a block diagram illustrating an example of input and output characteristics and input and output waveforms of an amplification circuit of the comparative example.

FIG. 3 is a diagram illustrating an example of input and output characteristics and input and output waveforms of the amplification circuit of the comparative example.

As illustrated in FIG. 3, the input and output characteristics of the amplification circuit 102 have a linear region and a nonlinear region. In a signal input to the amplification circuit 102, Center Eye operates in the linear region. Therefore, the signal of Center Eye is appropriately amplified by the amplification circuit 102, and in a signal output from the amplification circuit 102, a large amplitude is obtained for Center Eye.

Meanwhile, in the signal input to the amplification circuit 102, Upper Eye and Lower Eye operate in the nonlinear region. Therefore, in the signal output from the amplification circuit 102, the amplitudes of the signals of the Upper Eye and Lower Eye are clipped, and large amplitudes cannot be obtained for the Upper Eye and Lower Eye. That is, the Upper Eye and the Lower Eye may not be appropriately amplified by the amplification circuit 102.

As described above, when the Upper Eye and Lower Eye cannot be appropriately amplified by the amplification circuit 102, the sense amplifiers 103a and 103c cannot accurately determine (compare) with a threshold voltages. Therefore, the receiver circuit RXc of the comparative example may not be able to properly restore data.

In contrast, the receiver circuit RX (RXa, RXb) of the embodiment has a configuration that can appropriately restore data.

FIG. 4 is a block diagram illustrating an example of the configuration of the receiver circuit of the first embodiment.

The receiver circuit RXa includes a CTLE circuit 31, voltage sources 32a and 32b, amplification circuits 33a to 33c, sense amplifiers 34a to 34c, and a determination circuit 35. The amplification circuit 33a and the sense amplifier 34a are circuits for processing regarding the Upper Eye of a signal. The amplification circuit 33b and the sense amplifier 34b are circuits for processing regarding Center Eye of the signal. The amplification circuit 33c and the sense amplifier 34c are circuits for processing regarding the Lower Eye of the signal. The CTLE circuit 31 receives a differential PAM4 signal (referred to as a received signal in the following description) from the transmitter circuit TX. The CTLE circuit 31 performs various signal processing such as equalizing processing on the received signal, and outputs the received signal subjected to the signal processing to the voltage source 32a, the amplification circuit 33b, and the voltage source 32b. The CTLE circuit 31 compensates for loss occurring in the transmission path using, for example, a high-pass filter, and reduces jitter for the received signal.

The voltage source 32a applies a negative offset voltage to the received signal output from the CTLE circuit 31 and outputs the received signal with the negative offset voltage to the amplification circuit 33a. Specifically, the voltage source 32a applies an offset voltage of −Vos so that the center of the Upper Eye is 0 V. The voltage source 32a is an example of a first offset circuit.

The voltage source 32b applies a positive offset voltage to the received signal output from the CTLE circuit 31 and outputs the received signal with the positive offset voltage to the amplification circuit 33c. Specifically, the voltage source 32b applies an offset voltage of +Vos so that the center of the Lower Eye is 0 V. The voltage source 32b is an example of a second offset circuit.

The amplification circuit 33a amplifies the received signal output from the voltage source 32a and outputs the amplified received signal to the sense amplifier 34a. The amplification circuit 33b amplifies the received signal output from the CTLE circuit 31 and outputs the amplified received signal to the sense amplifier 34b. The amplification circuit 33c amplifies the received signal output from the voltage source 32b and outputs the amplified received signal to the sense amplifier 34c. The amplification circuit 33a is an example of a first amplification circuit, the amplification circuit 33b is an example of a third amplification circuit, and the amplification circuit 33c is an example of a second amplification circuit.

The sense amplifier 34a compares the received signal amplified by the amplification circuit 33a with the threshold voltage VREF in synchronization with the clock signal CLK, and outputs the comparison result to the determination circuit 35.

The sense amplifier 34b compares the received signal amplified by the amplification circuit 33b with the threshold voltage VREF in synchronization with the clock signal CLK, and outputs the comparison result to the determination circuit 35.

The sense amplifier 34c compares the received signal amplified by the amplification circuit 33c with the threshold voltage VREF in synchronization with the clock signal CLK, and outputs the comparison result to the determination circuit 35.

The threshold voltage VREF of each of the sense amplifiers 34a to 34c is a reference voltage (0 V). The sense amplifier 34a is an example of a first comparison circuit, the sense amplifier 34b is an example of a third comparison circuit, and the sense amplifier 34c is an example of a second comparison circuit.

The determination circuit 35 determines a value of transmitted data based on the comparison results of the sense amplifiers 34a to 34c. More specifically, the determination circuit 35 determines whether a bit pattern of the transmitted data is one of four values of "00", "01", "10", and "11" based on the comparison results of the sense amplifiers 34a to 34c.

Figure 5A:
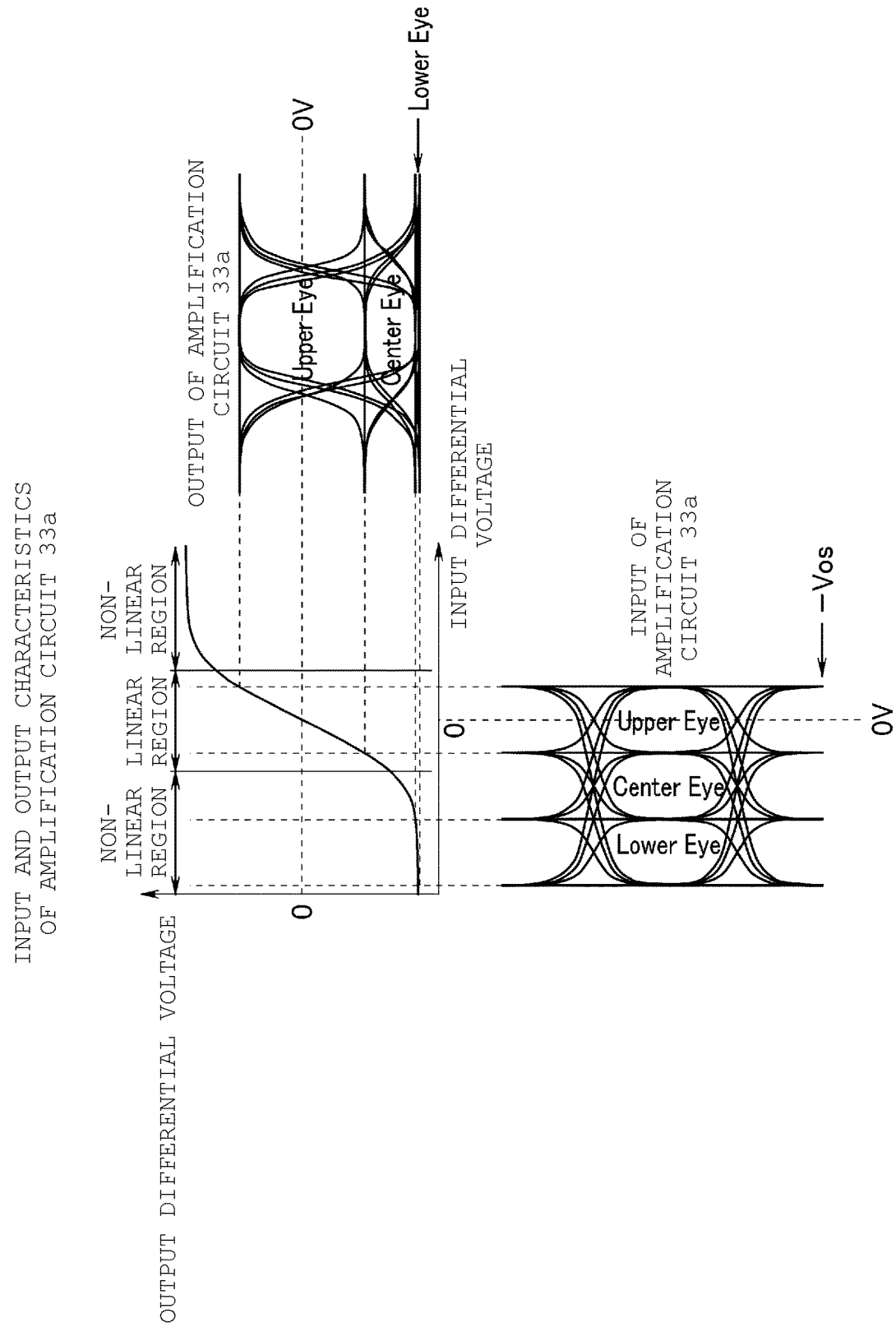
FIG. 5A is a diagram illustrating an example of input and output characteristics and input and output waveforms of an amplification circuit regarding Upper Eye.
Figure 5B:
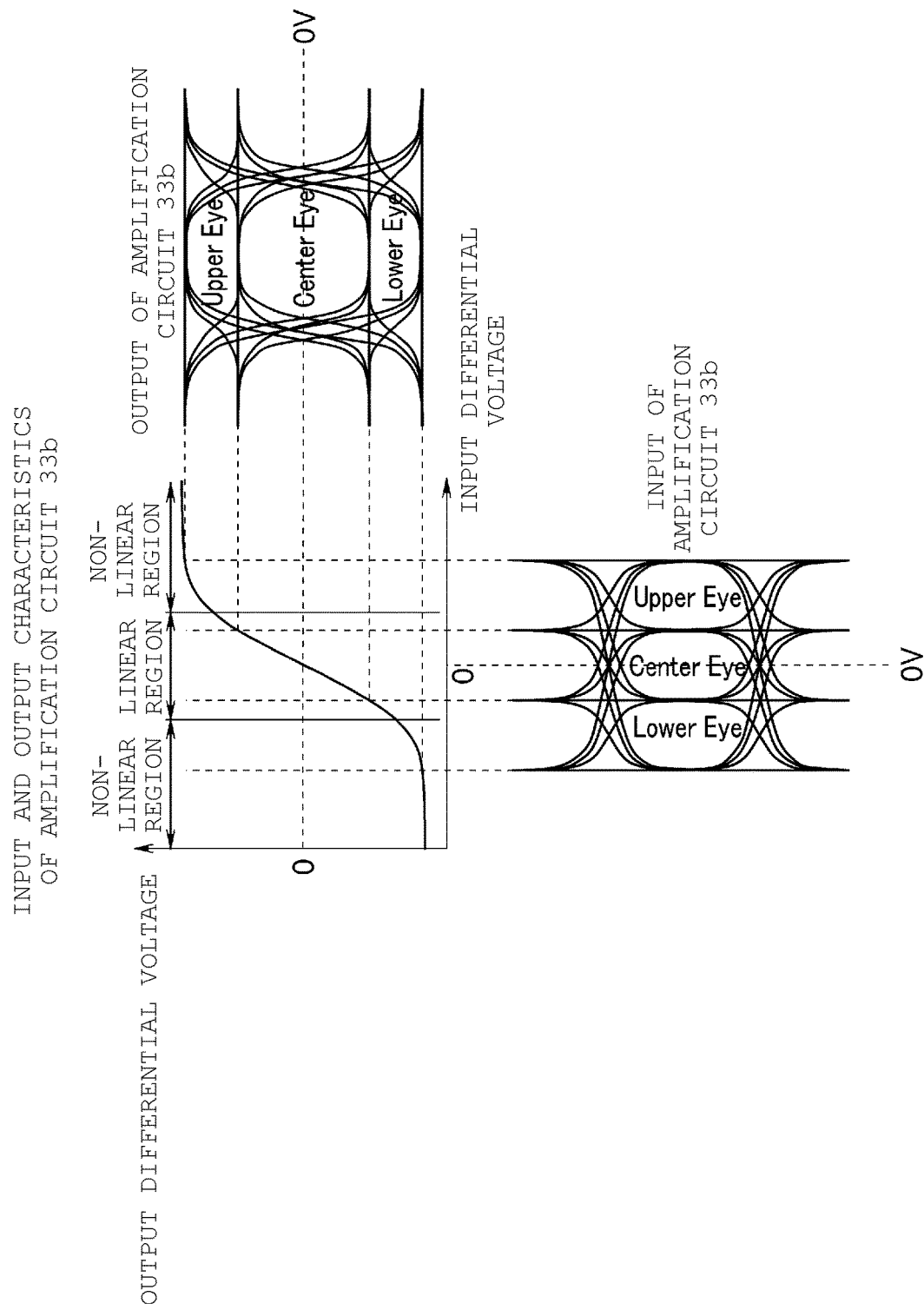
FIG. 5B is a diagram illustrating an example of input and output characteristics and input and output waveforms of an amplification circuit regarding Center Eye.
Figure 5C:
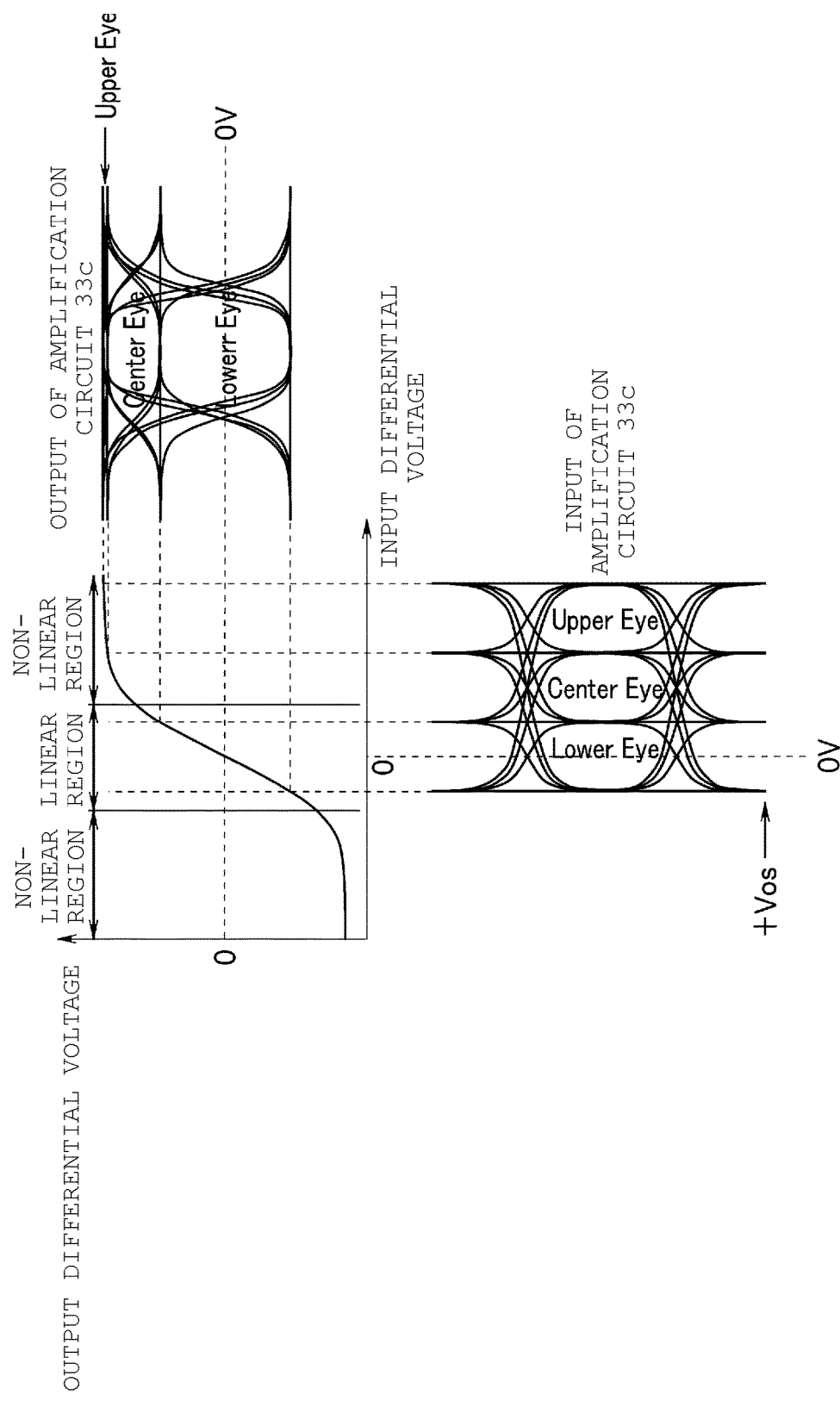
FIG. 5C is a diagram illustrating an example of input and output characteristics and input and output waveforms of an amplification circuit regarding Lower Eye.

FIG. 5A is a diagram illustrating an example of input and output characteristics and input and output waveforms of the amplification circuit regarding the Upper Eye. FIG. 5B is a diagram illustrating an example of input and output characteristics and input and output waveforms of an amplification circuit regarding the Center Eye. FIG. 5C is a diagram illustrating an example of input and output characteristics and input and output waveforms of an amplification circuit regarding the Lower Eye.

A signal to which the negative offset voltage (−Vos) is applied by the voltage source 32a so that the center of the Upper Eye is 0 V is input to the amplification circuit 33a. Accordingly, as illustrated in FIG. 5A, a signal in which the center of the Upper Eye is 0 V is input to the amplification circuit 33a.

By applying the negative offset voltage to set the center of the Upper Eye to 0 V, the Upper Eye operates in the linear region in the amplification circuit 33a. Therefore, the signal of the Upper Eye is appropriately amplified by the amplification circuit 33a. As a result, in the signal output from the amplification circuit 33a, a large amplitude is obtained for the Upper Eye.

The signal output from the CTLE circuit 31 is input to the amplification circuit 33b. Accordingly, as illustrated in FIG. 5B, a signal in which the center of the Center Eye is 0 V is input to the amplification circuit 33b.

As such, by inputting the signal output from the CTLE circuit 31 to the amplification circuit 33b without applying an offset voltage thereto, in the amplification circuit 33b, the Center Eye operates in the linear region. Therefore, the signal of the Center Eye is appropriately amplified by the amplification circuit 33b. As a result, in the signal output from the amplification circuit 33b, a large amplitude is obtained for the Center Eye.

A signal to which the positive offset voltage (+Vos) is applied by the voltage source 32b so that the center of the Lower Eye is 0 V is input to the amplification circuit 33c. Accordingly, as illustrated in FIG. 5C, a signal in which the center of the Lower Eye is 0 V is input to the amplification circuit 33c.

By applying the positive offset voltage to set the center of the Lower Eye to 0 V, the Lower Eye operates in the linear region in the amplification circuit 33c. Therefore, the signal of the Lower Eye is appropriately amplified by the amplification circuit 33c. As a result, in the signal output from the amplification circuit 33c, a large amplitude is obtained for the Lower Eye.

As illustrated in FIG. 4, the sense amplifier 34a compares the output signal of the amplification circuit 33a from which the large amplitude of the Upper Eye is obtained with the threshold voltage VREF (0 V). Similarly, the sense amplifier 34b compares the output signal of the amplification circuit 33b from which the large amplitude of the Center Eye is obtained with the threshold voltage VREF (0 V). Similarly, the sense amplifier 34c compares the output signal of the amplification circuit 33c from which the large amplitude of the Lower Eye is obtained with the threshold voltage VREF (0 V).

Each of the sense amplifiers 34a to 34c compares the signal from which the large amplitude is obtained with the threshold voltage VREF, and thus can accurately determine (compare) with the threshold voltage.

The determination circuit 35 determines the bit pattern of the transmission data based on the comparison results obtained by accurately determining (comparing) with the threshold voltages by the sense amplifiers 34a to 34c. As such, the receiver circuit RX of the embodiment can accurately determine (compare) with the threshold voltages by comparing the signal having a large amplitude and preventing amplitude clipping with the threshold voltage VREF, and thus can appropriately restore data from the signal.

Modification 1

Next, a Modification 1 of the first embodiment will be described.

Figure 6:
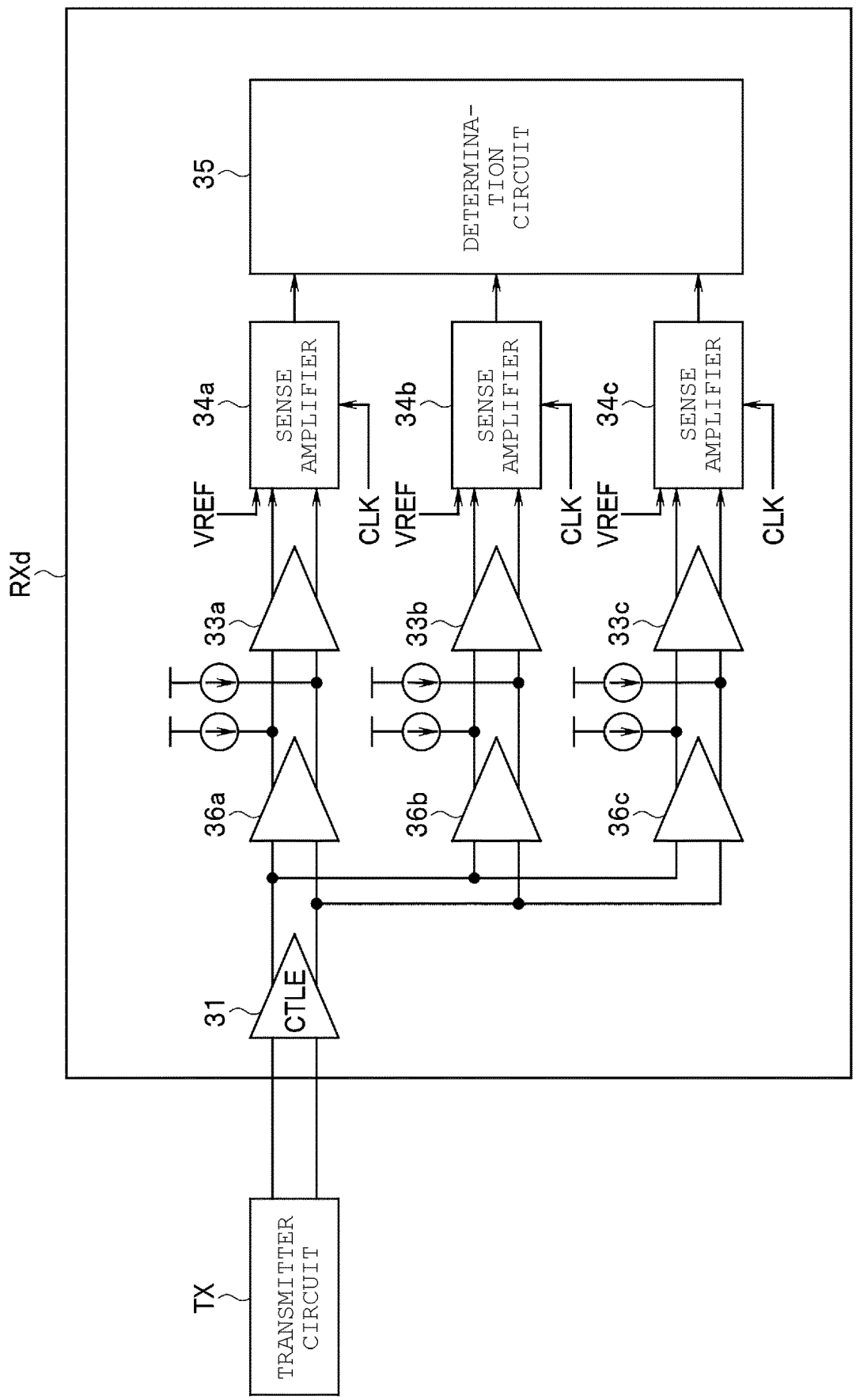
FIG. 6 is a block diagram illustrating an example of a configuration of a receiver circuit according to Modification 1 of the first embodiment.

FIG. 6 is a block diagram illustrating an example of a configuration of a receiver circuit of the Modification 1 of the first embodiment. In FIG. 6, the same configurations as those in FIG. 4 are given the same reference numerals, and the description thereof will be omitted.

As illustrated in FIG. 6, a receiver circuit RXd according to the Modification 1 of the first embodiment includes buffer circuits 36a to 36c that respectively provide output offsets between the CTLE circuit 31 and the amplification circuits 33a to 33c.

The buffer circuit 36a applies a negative offset voltage (−Vos) to the received signal output from the CTLE circuit 31 so that the center of the Upper Eye is 0 V and outputs the received signal with the negative offset voltage to the amplification circuit 33a.

The buffer circuit 36b applies an offset voltage of 0 V to the received signal output from the CTLE circuit 31 and outputs the received signal without the offset voltage to the amplification circuit 33b.

The buffer circuit 36c applies a positive offset voltage (+Vos) to the received signal output from the CTLE circuit 31 so that the center of the Lower Eye is 0 V and outputs the received signal with the positive offset voltage to the amplification circuit 33c.

Other configurations are similar to the receiver circuit RX of the first embodiment. With such a configuration, the receiver circuit RXd can obtain a large amplitude for each of the Upper Eye, Center Eye, and Lower Eye. Therefore, the receiver circuit RXd can accurately determine (compare) with the threshold voltage by comparing the signal having a large amplitude and preventing amplitude clipping with the threshold voltage VREF, and thus can appropriately restore data from the signal.

Modification 2

Next, a Modification 2 of the first embodiment will be described.

Figure 7:
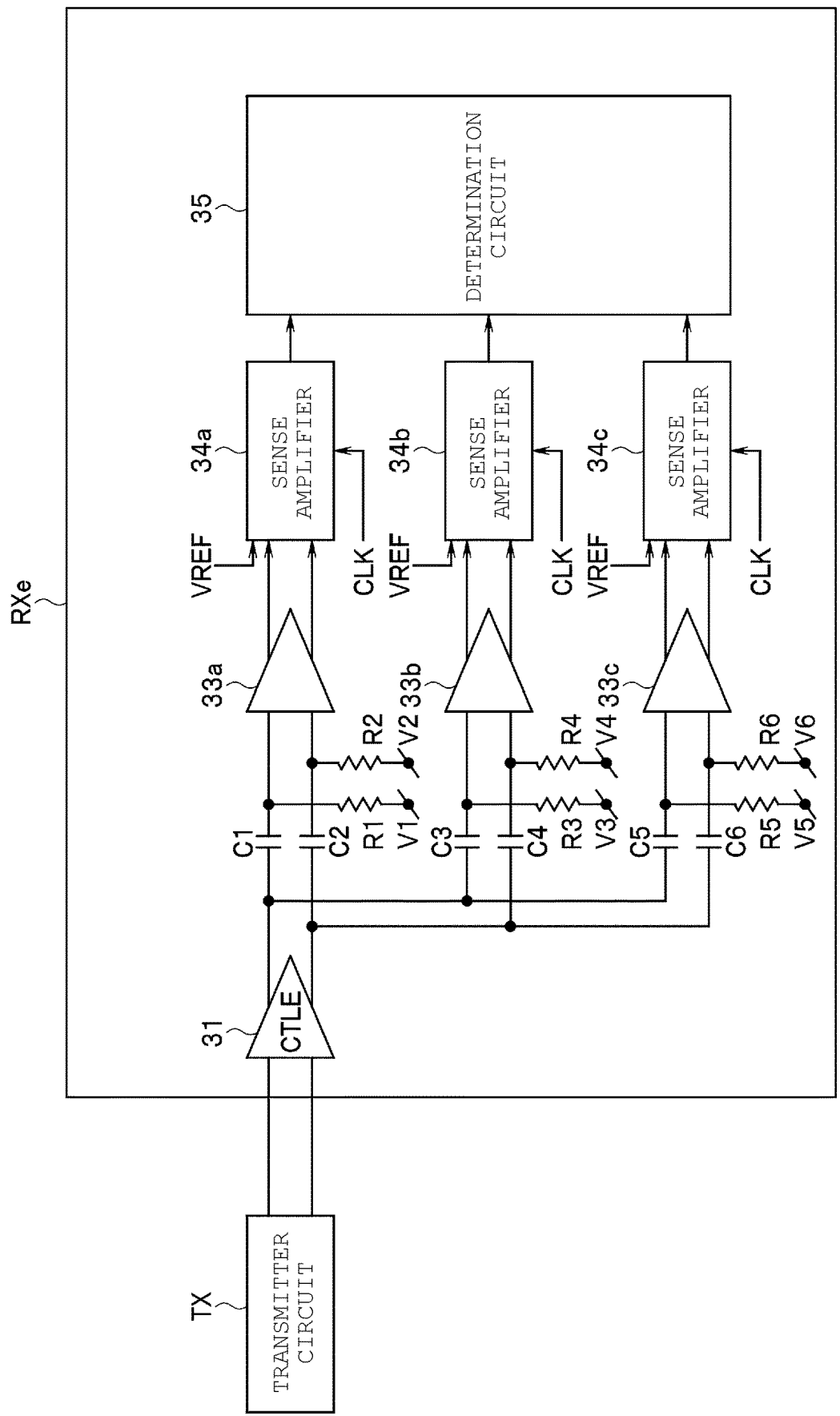
FIG. 7 is a block diagram illustrating an example of a configuration of a receiver circuit according to Modification 2 of the first embodiment.

FIG. 7 is a block diagram illustrating an example of a configuration of a receiver circuit according to the Modification 2 of the first embodiment. In FIG. 7, the same configurations as those in FIG. 4 are given the same reference numerals, and the description thereof will be omitted.

A receiver circuit RXe according to the Modification 2 of the first embodiment includes capacitors C1 and C2 and pull-up resistors R1 and R2 for applying an input offset voltage between the CTLE circuit 31 and the amplification circuit 33a. The receiver circuit RXe also includes capacitors C3 and C4 and pull-up resistors R3 and R4 for applying an input offset voltage between the CTLE circuit 31 and the amplification circuit 33b. The receiver circuit RXe also includes capacitors C5 and C6 and pull-up resistors R5 and R6 for applying an input offset voltage between the CTLE circuit 31 and the amplification circuit 33c.

The capacitors C1 and C2 and the pull-up resistors R1 and R2 apply a negative offset voltage (−Vos) to the received signal output from the CTLE circuit 31 so that the center of the Upper Eye is 0 V and output the received signal with the negative offset voltage to the amplification circuit 33a.

The capacitors C3 and C4 and the pull-up resistors R3 and R4 apply the offset voltage of 0 V to the received signal output from the CTLE circuit 31 and output the received signal without the offset voltage to the amplification circuit 33b.

The capacitors C5 and C6 and the pull-up resistors R5 and R6 apply a positive offset voltage (+Vos) to the received signal output from the CTLE circuit 31 so that the center of the Lower Eye is 0 V and output the received signal with the positive offset voltage to the amplification circuit 33c.

Other configurations are similar to the receiver circuit RX of the first embodiment. With such a configuration, similar to the first embodiment, the receiver circuit RXe can accurately determine (compare) with the threshold voltage by comparing the signal having a large amplitude and preventing amplitude clipping with the threshold value VREF, and thus can appropriately restore data from the signal.

Modification 3

Next, a Modification 3 of the first embodiment will be described.

Figure 8:
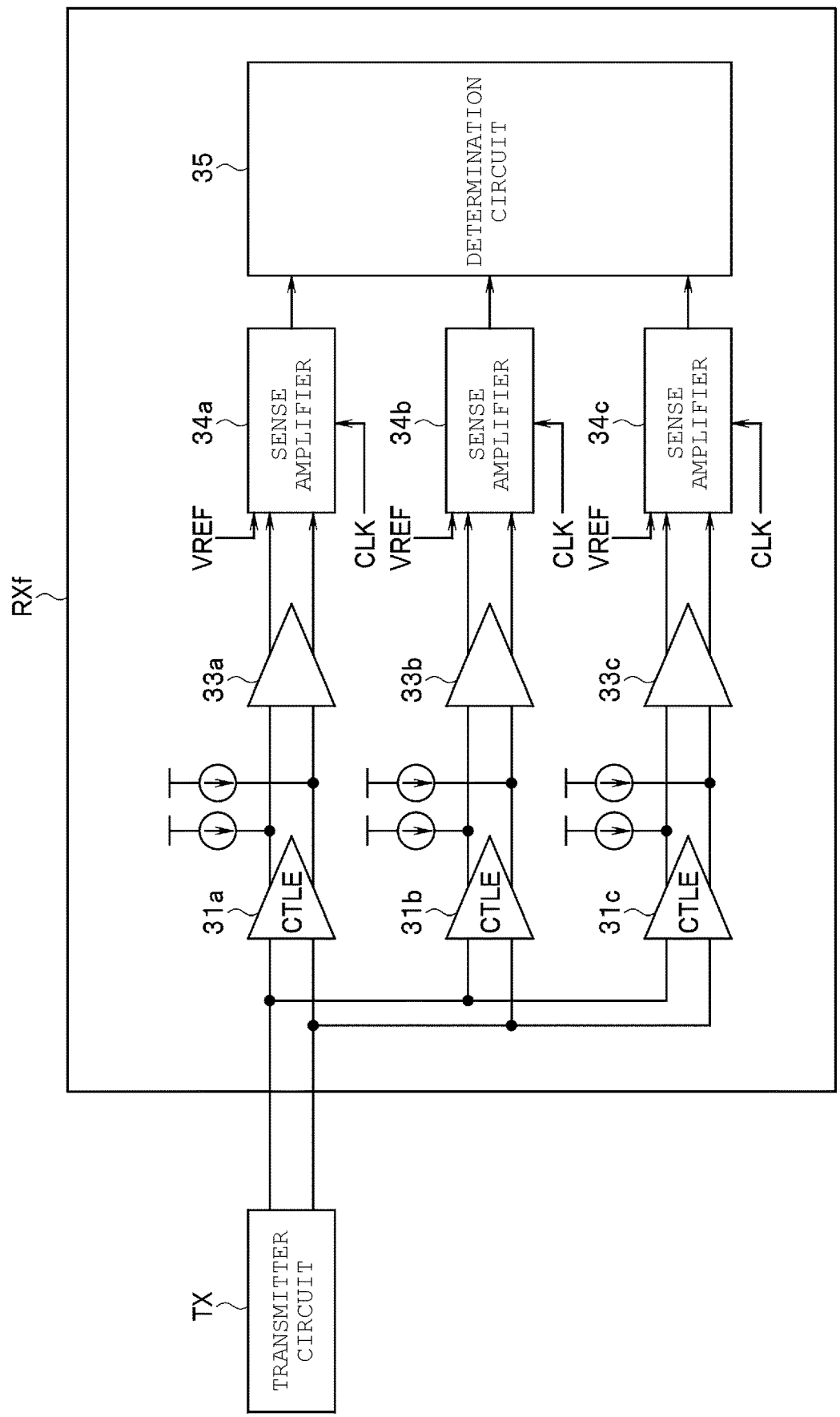
FIG. 8 is a block diagram illustrating an example of a configuration of a receiver circuit according to Modification 3 of the first embodiment.

FIG. 8 is a block diagram illustrating an example of a configuration of a receiver circuit according to the Modification 3 of the first embodiment. In FIG. 8, the same configurations as those in FIG. 4 are given the same reference numerals, and the description thereof will be omitted.

As illustrated in FIG. 8, a receiver circuit RXf according to the Modification 3 of the first embodiment uses CTLE circuits 31a to 31c that provide an output offset instead of the CTLE circuit 31 in FIG. 4. The CTLE circuits 31a to 31c receive the PAM4 signal transmitted from the transmitter circuit TX. The CTLE circuits 31a to 31c are respectively connected to the amplification circuits 33a to 33c.

The CTLE circuit 31a performs various signal processing such as equalizing processing on the received signal, applies a negative offset voltage to the received signal subjected to the signal processing, and outputs the received signal with the negative offset voltage to the amplification circuit 33a. The CTLE circuit 31a applies the negative offset voltage (−Vos) so that the center of the Upper Eye is 0 V.

The CTLE circuit 31b performs various signal processing such as equalizing processing on the received signal, applies the offset voltage of 0 V to the received signal subjected to the signal processing, and outputs the received signal without the offset voltage to the amplification circuit 33b.

The CTLE circuit 31c performs various signal processing such as equalizing processing on the received signal, applies a positive offset voltage to the received signal subjected to the signal processing, and outputs the received signal with the positive offset voltage to the amplification circuit 33c. The CTLE circuit 31c applies the positive offset voltage (+Vos) so that the center of the Lower Eye is 0 V.

Other configurations are similar to the receiver circuit RX of the first embodiment. With such a configuration, similar to the first embodiment, the receiver circuit RXf can accurately determine (compare) with the threshold voltage by comparing the signal having a large amplitude and preventing amplitude clipping with the threshold value VREF, and thus can appropriately restore data from the signal.

Modification 4

Next, a Modification 4 of the first embodiment will be described.

Figure 9:
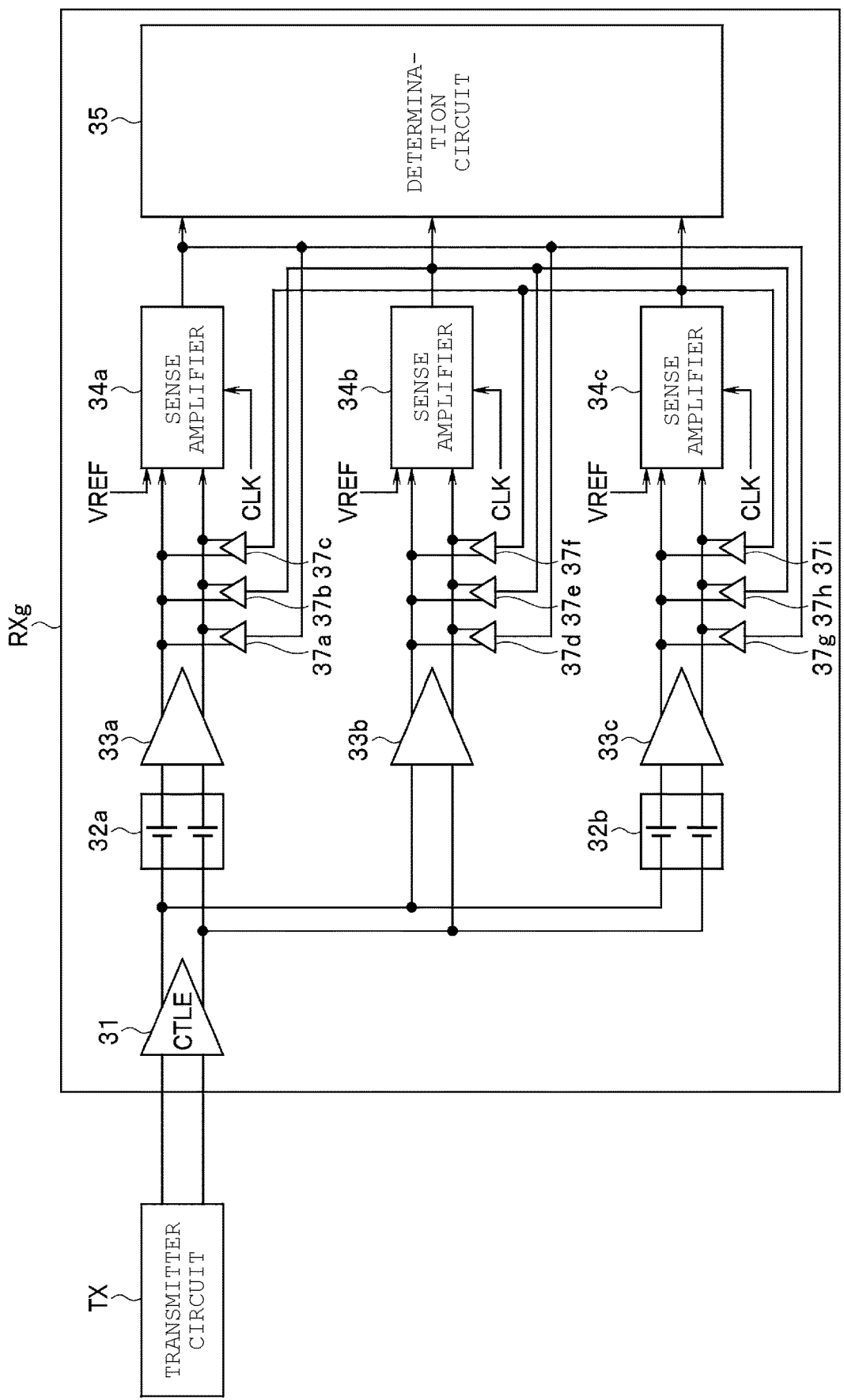
FIG. 9 is a block diagram illustrating an example of a configuration of a receiver circuit according to Modification 4 of the first embodiment.

FIG. 9 is a block diagram illustrating an example of a configuration of a receiver circuit of the Modification 4 of the first embodiment. In FIG. 9, the same configurations as those in FIG. 4 are given the same reference numerals, and the description thereof will be omitted.

As illustrated in FIG. 9, a receiver circuit RXg according to the Modification 4 of the first embodiment is an example in which a decision feedback equalizer is applied to the configuration of FIG. 4. In the receiver circuit RXg, buffer circuits 37a to 37i are added to the configuration of FIG. 4.

Output signals of the sense amplifiers 34a to 34c are delayed by the buffer circuits 37a to 37c, respectively, and superimposed on the received signal output from the amplification circuit 33a. Similarly, the output signals of the sense amplifiers 34a to 34c are delayed by the buffer circuits 37d to 37f, respectively, and superimposed on the received signal output from the amplification circuit 33b. Similarly, the output signals of the sense amplifiers 34a to 34c are delayed by the buffer circuits 37g to 37i, respectively, and superimposed on the received signal output from the amplification circuit 33c.

By applying such a decision feedback type equalizer, the receiver circuit RXg compensates for ISI jitter. Other configurations are similar to the receiver circuit RX of the first embodiment. With such a configuration, similar to the first embodiment, the receiver circuit RXg can accurately determine (compare) with the threshold voltage by comparing signal having a large amplitude and preventing amplitude clipping with the threshold voltage VREF, and thus can appropriately restore data from the signal.

Second Embodiment

Next, a second embodiment will be described.

In the receiver circuit RX (RXa, RXb) of the first embodiment, the amplification circuits 33a to 33c are provided at a front stage of the sense amplifiers 34a to 34c, respectively. Therefore, the receiver circuit RX of the first embodiment requires three times as many amplification circuits as the receiver circuit RXc of the comparative example, and a circuit area increases.

Therefore, in the second embodiment, a receiver circuit that can reduce the circuit area compared to the first embodiment will be described.

Figure 10:
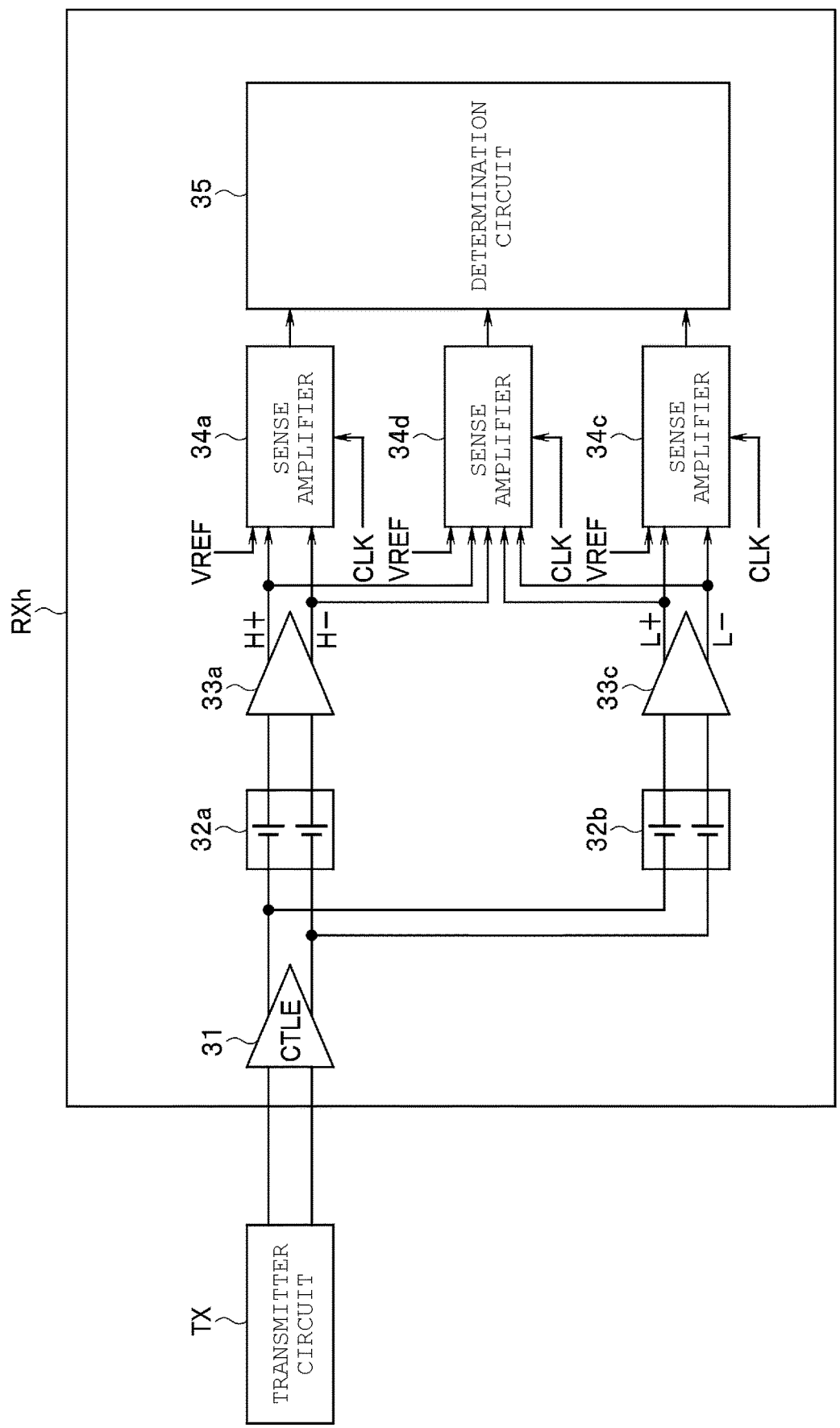
FIG. 10 is a block diagram illustrating an example of a configuration of a receiver circuit according to a second embodiment.

FIG. 10 is a block diagram illustrating an example of a configuration of the receiver circuit according to the second embodiment. In FIG. 10, the same configurations as those in FIG. 4 are given the same reference numerals, and the description thereof will be omitted.

As illustrated in FIG. 10, in a receiver circuit RXh, the amplification circuit 33b is removed from the receiver circuit RXa of FIG. 4, and a sense amplifier 34d with an interpolation processing function is provided instead of the sense amplifier 34b.

Output signals H+ and H− of the amplification circuit 33a and output signals L+ and L− of the amplification circuit 33c are input to the sense amplifier 34d. The sense amplifier 34d performs an interpolation processing on the signal of the Upper Eye and the signal of the Lower Eye to generate the signal of the Center Eye. Then, the sense amplifier 34d compares the signal of the Center Eye generated by the interpolation processing with the threshold voltage VREF, and outputs the comparison result to the determination circuit 35.

Figure 11:
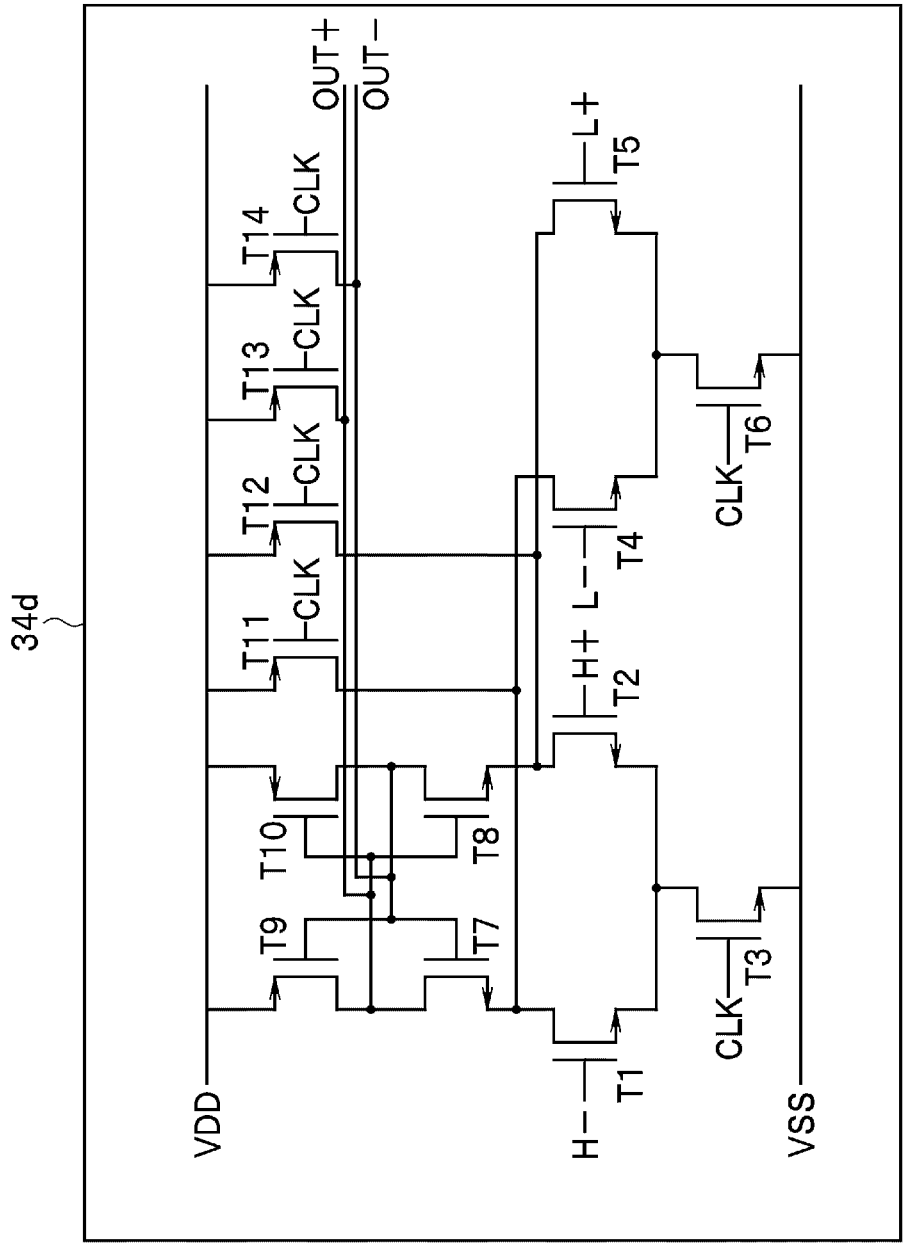
FIG. 11 is a circuit diagram illustrating an example of a configuration of a sense amplifier with interpolation processing function.

FIG. 11 is a circuit diagram illustrating an example of a configuration of the sense amplifier with interpolation processing function.

The sense amplifier 34d includes transistors T1 to T14. The transistors T1 to T8 are NMOS transistors, and the transistors T9 to T14 are PMOS transistors.

The output signal H− of the amplification circuit 33a is input to a gate of the transistor T1. A source of the transistor T1 is connected to a source of the transistor T2 and a drain of the transistor T3. A drain of the transistor T1 is connected to a drain of the transistor T4, a source of the transistor T7, and a drain of the transistor T11.

The output signal H+ of the amplification circuit 33a is input to a gate of the transistor T2. The source of the transistor T2 is connected to the source of the transistor T1 and the drain of the transistor T3. A drain of the transistor T2 is connected to a drain of the transistor T5, a source of the transistor T8, and a drain of the transistor T12.

The clock signal CLK is input to a gate of the transistor T3. A source of the transistor T3 is connected to a reference voltage VSS, and the drain of the transistor T3 is connected to the source of each of the transistors T1 and T2. The reference voltage VSS is a reference voltage when the sense amplifier 34d operates, and is, for example, a ground voltage.

The output signal L− of the amplification circuit 33c is input to a gate of the transistor T4. A source of the transistor T4 is connected to a source of the transistor T5 and a drain of the transistor T6. The drain of the transistor T4 is connected to the drain of the transistor T1, the source of the transistor T7, and the drain of the transistor T11.

The output signal L+ of the amplification circuit 33c is input to a gate of the transistor T5. The source of the transistor T5 is connected to the source of the transistor T4 and the drain of the transistor T6. The drain of the transistor T5 is connected to the drain of the transistor T2, the source of the transistor T8, and the drain of the transistor T12.

The clock signal CLK is input to a gate of the transistor T6. A source of the transistor T6 is connected to the reference voltage VSS, and the drain of the transistor T6 is connected to each of the sources of the transistors T4 and T5.

An inverter is configured with the transistors T7 and T9. An inverter is configured with the transistors T8 and T10. An output OUT+ is output from the inverter configured with the transistors T7 and T9, and an output OUT− is output from the inverter configured with the transistors T8 and T10.

Gates of the transistors T7 and T9 are connected in common. Drains of the transistors T7 and T9 are connected in common. The gates of the transistors T7 and T9 are connected to the output of the inverter configured with the transistors T8 and T10.

The source of the transistor T7 is connected to the drains of the transistors T1, T4, and T11. A source of the transistor T9 is connected to a power supply voltage VDD. The power supply voltage VDD is a potential of the power supply voltage when the sense amplifier 34d operates. The potential of the power supply voltage VDD is higher than a potential of the reference voltage VSS.

Gates of the transistors T8 and T10 are connected in common. Drains of the transistors T8 and T10 are connected in common. The gates of the transistors T8 and T10 are connected to an output of the inverter configured with the transistors T7 and T9.

The source of the transistor T8 is connected to each of the drains of the transistors T2, T5 and T12. A source of the transistor T10 is connected to the power supply voltage VDD.

The clock signal CLK is input to gates of the transistors T11 to T14. Sources of the transistors T11 to T14 are connected to the power supply voltage VDD. The drain of the transistor T11 is connected to each of the drains of the transistors T1 and T4. The drain of the transistor T12 is connected to each of the drains of the transistors T2 and T5. A drain of the transistor T13 is connected to the output of the inverter configured with the transistors T7 and T9. A drain of the transistor T14 is connected to the output of the inverter configured with the transistors T8 and T10.

The sense amplifier 34d configured as described above performs the interpolation processing to generate the signal of the Center Eye. Then, the sense amplifier 34d determines (compare) with the threshold voltage on the generated signal of the Center Eye. Accordingly, there is no need to provide an amplification circuit corresponding to the front stage of the sense amplifier 34d.

Specifically, the receiver circuit RX of the first embodiment includes three amplification circuits 33a to 33c, whereas the receiver circuit RXh of the second embodiment includes two amplification circuits 33a and 33c and does not include the amplification circuit 33b. Therefore, in the receiver circuit RXh of the second embodiment, the number of amplification circuits is reduced by one compared to the receiver circuit RX of the first embodiment, and an area of the amplification circuit can be reduced by about 33%. For example, when the amplification circuit is configured to amplify a signal by using an inductor load circuit, the effect of area reduction becomes greater.

The second embodiment is not limited to process the PAM4 signal, but may be applied to process PAM-N signal (N is an integer of 4 or more). For example, when N=8, the receiver circuit RX of the first embodiment that does not perform the interpolation processing requires seven (=N−1) amplification circuits. In contrast, the receiver circuit RXh of the second embodiment that performs the interpolation processing requires four (=N/2) amplification circuits. Therefore, in the receiver circuit RXh of the second embodiment, the number of amplification circuits can be reduced by three compared to the receiver circuit RX of the first embodiment, and the area of the amplification circuit can be reduced by about 43%.

For example, when N=16, the receiver circuit RX of the first embodiment that does not perform the interpolation processing requires 15 (=N−1) amplification circuits. In contrast, the receiver circuit RXh of the second embodiment that performs the interpolation_processing requires eight (=N/2) amplification circuits. Therefore, in the receiver circuit RXh of the second embodiment, the number of amplification circuits can be reduced by seven compared to the receiver circuit RX of the first embodiment, and the area of the amplification circuit can be reduced by about 47%.

As such, as the amount of data transmitted per time slot increases, the receiver circuit RXh of the second embodiment can achieve a higher rate of reduction in circuit area than the receiver circuit RX of the first embodiment.

As described above, similar to the first embodiment, the receiver circuit RXh of the second embodiment can appropriately restore data from the signal, and can have a smaller circuit area than that of the receiver circuit RX of the first embodiment.

Modification 1 of Second Embodiment

Next, a Modification 1 of the second embodiment will be described.

Figure 12:
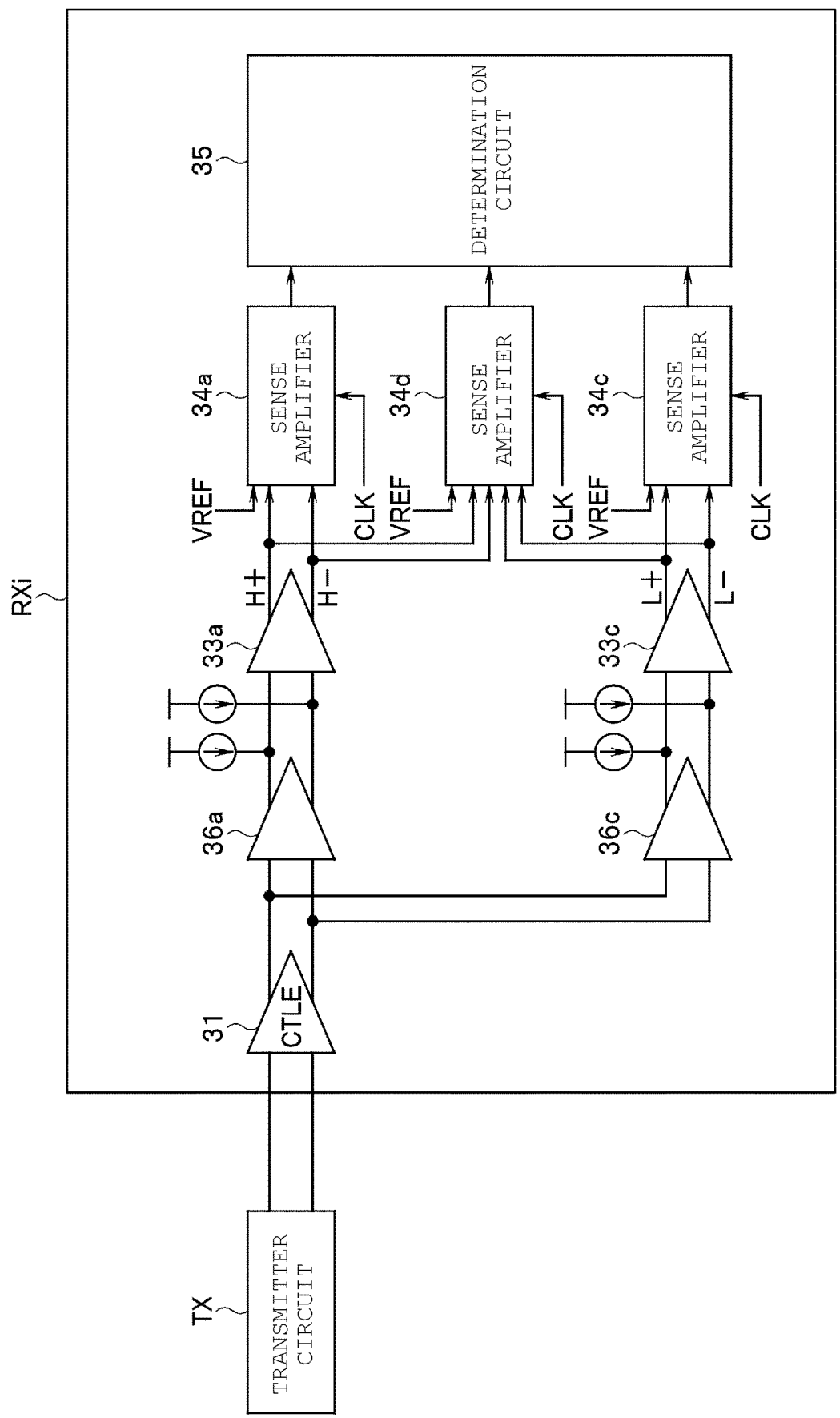
FIG. 12 is a block diagram illustrating an example of a configuration of a receiver circuit according to Modification 1 of the second embodiment.

FIG. 12 is a block diagram illustrating an example of a configuration of a receiver circuit of the Modification 1 of the second embodiment. In FIG. 12, the same configurations as those in FIGS. 6 and 10 are given the same reference numerals, and the description thereof will be omitted. A receiver circuit RXi of FIG. 12 is an example in which the sense amplifier 34d with the interpolation processing function of FIG. 10 is applied to the receiver circuit RXd of FIG. 6.

As illustrated in FIG. 12, in the receiver circuit RXi according to the Modification 1 of the second embodiment, the buffer circuit 36b that provides the output offset and the amplification circuit 33b are removed from the receiver circuit RXd of FIG. 6. The receiver circuit RXi includes the sense amplifier 34d with the interpolation processing function illustrated in FIG. 10 instead of the sense amplifier 34b of the receiver circuit RXd of FIG. 6.

Similar to the second embodiment, the output signals H+ and H− of the amplification circuit 33a and the output signals L+ and L− of the amplification circuit 33c are input to the sense amplifier 34d. The sense amplifier 34d performs the interpolation processing on the signal of the Upper Eye and the signal of the Lower Eye to generate the signal of the Center Eye. Then, the sense amplifier 34d compares the signal of the Center Eye generated by the interpolation processing with the threshold voltage VREF, and outputs the comparison result to the determination circuit 35.

With the configuration described above, similar to the first embodiment, the receiver circuit RXi can appropriately restore data from the signal, and can have a smaller circuit area than that of the receiver circuit RXd of Modification 1 of the first embodiment.

Modification 2 of Second Embodiment

Next, a Modification 2 of the second embodiment will be described.

Figure 13:
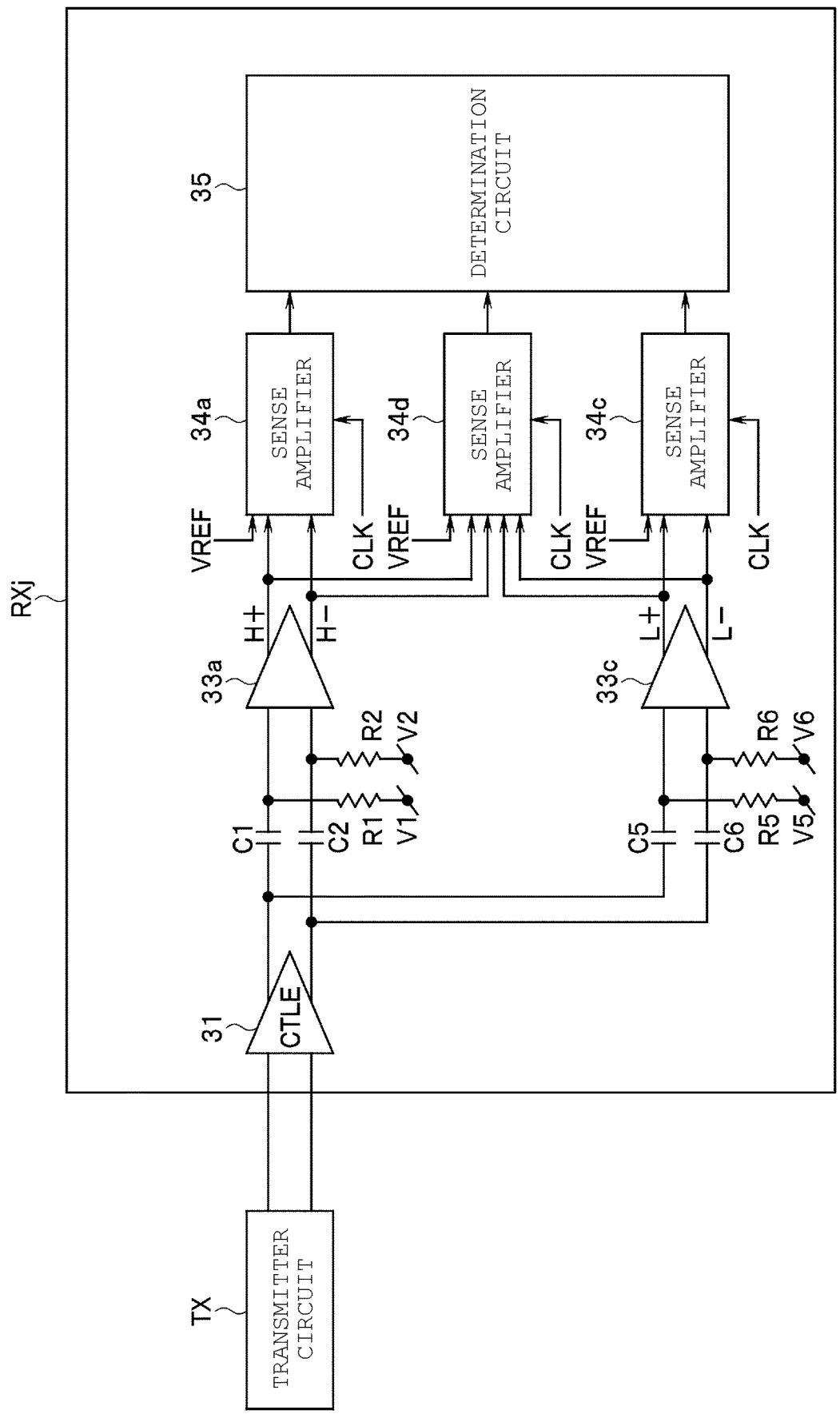
FIG. 13 is a block diagram illustrating an example of a configuration of a receiver circuit according to Modification 2 of the second embodiment.

FIG. 13 is a block diagram illustrating an example of a configuration of a receiver circuit according to the Modification 2 of the second embodiment. In FIG. 13, the same configurations as those in FIGS. 7 and 10 are given the same reference numerals, and the description thereof will be omitted.

A receiver circuit RXj of FIG. 13 is an example in which the sense amplifier 34d with the interpolation processing function of FIG. 10 is applied to the receiver circuit RXe of FIG. 7.

As illustrated in FIG. 13, in the receiver circuit RXj according to the Modification 2 of the second embodiment, the capacitors C3 and C4 that apply the input offset voltage and the amplification circuit 33b are removed from the receiver circuit RXe of FIG. 7. The receiver circuit RXj includes the sense amplifier 34d with the interpolation function illustrated in FIG. 10 instead of the sense amplifier 34b of the receiver circuit RXe of FIG. 7.

Similar to the second embodiment, the output signals H+ and H− of the amplification circuit 33a and the output signals L+ and L− of the amplification circuit 33c are input to the sense amplifier 34d. The sense amplifier 34d performs the interpolation processing on the signal of the Upper Eye and the signal of the Lower Eye to generate the signal of the Center Eye. Then, the sense amplifier 34d compares the signal of the Center Eye generated by the interpolation processing with the threshold voltage VREF, and outputs the comparison result to the determination circuit 35.

With the configuration described above, similar to the first embodiment, the receiver circuit RXj can appropriately restore data from the signal, and can have a smaller circuit area than that of the receiver circuit RXe of the Modification 2 of the first embodiment.

Modification 3 of Second Embodiment

Next, a Modification 3 of the second embodiment will be described.

Figure 14:
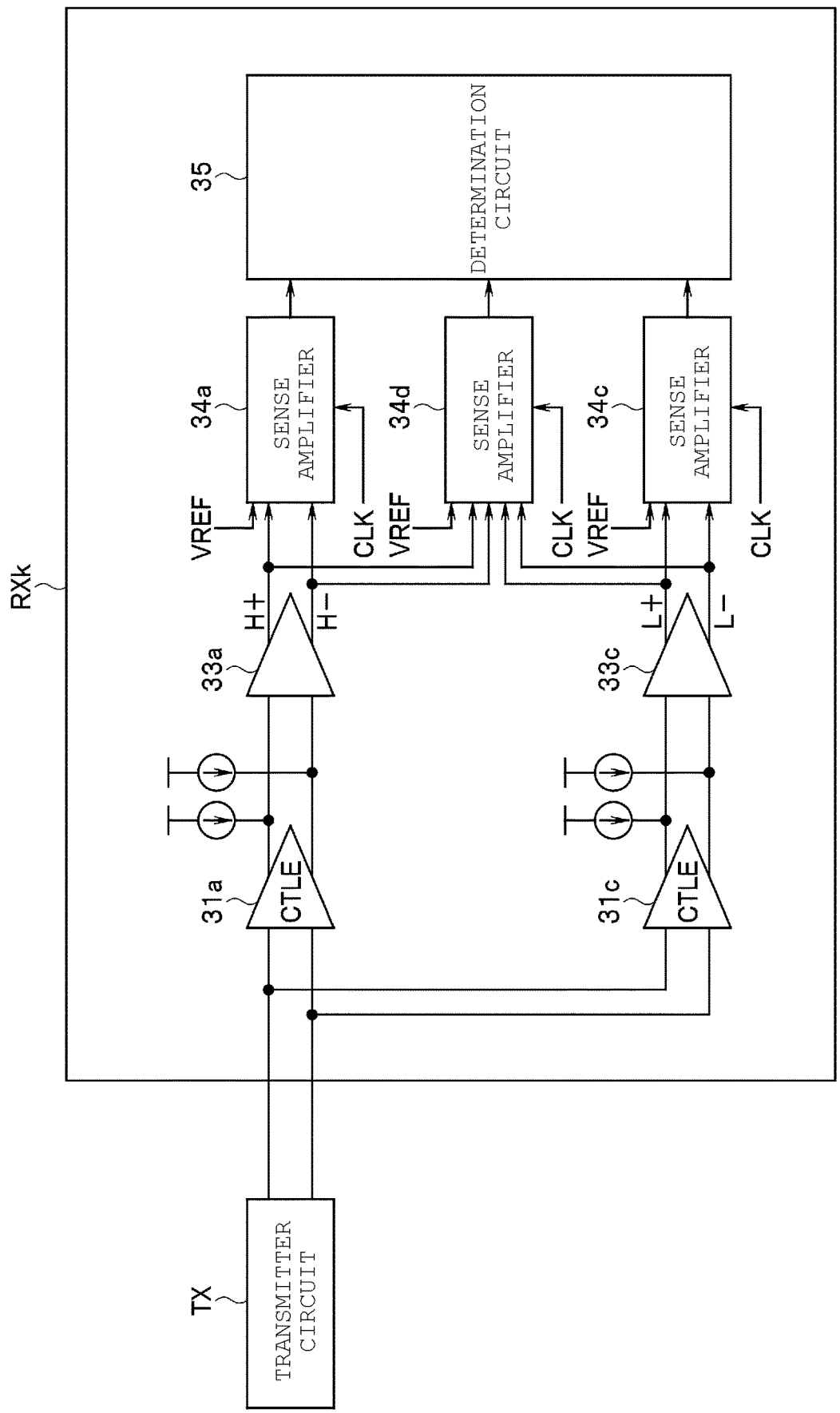
FIG. 14 is a block diagram illustrating an example of a configuration of a receiver circuit according to Modification 3 of the second embodiment.

FIG. 14 is a block diagram illustrating an example of a configuration of a receiver circuit according to the Modification 3 of the second embodiment. In FIG. 14, the same configurations as those in FIGS. 8 and 10 are given the same reference numerals, and the description thereof will be omitted. A receiver circuit RXk of FIG. 14 is an example in which the sense amplifier 34d with the interpolation processing function of FIG. 10 is applied to the receiver circuit RXf of FIG. 8.

As illustrated in FIG. 14, in the receiver circuit RXk according to the Modification 3 of the second embodiment, the CTLE circuit 31b that applies the output offset voltage and the amplification circuit 33b are removed from the receiver circuit RXf in FIG. 8. The receiver circuit RXk includes the sense amplifier 34d with the interpolation processing function illustrated in FIG. 10 instead of the sense amplifier 34b of the receiver circuit RXf of FIG. 8.

Similar to the second embodiment, the output signals H+ and H− of the amplification circuit 33a and the output signals L+ and L− of the amplification circuit 33c are input to the sense amplifier 34d. The sense amplifier 34d performs the interpolation processing on the signal of the Upper Eye and the signal of the Lower Eye to generate the signal of the Center Eye. Then, the sense amplifier 34d compares the signal of the Center Eye generated by the interpolation processing with the threshold voltage VREF, and outputs the comparison result to the determination circuit 35.

With the configuration described above, similar to the first embodiment, the receiver circuit RXk can appropriately restore data from the signal, and can have a smaller area than that of the receiver circuit RXf of the Modification 3 of the first embodiment.

Modification 4 of Second Embodiment

Next, a Modification 4 of the second embodiment will be described.

Figure 15:
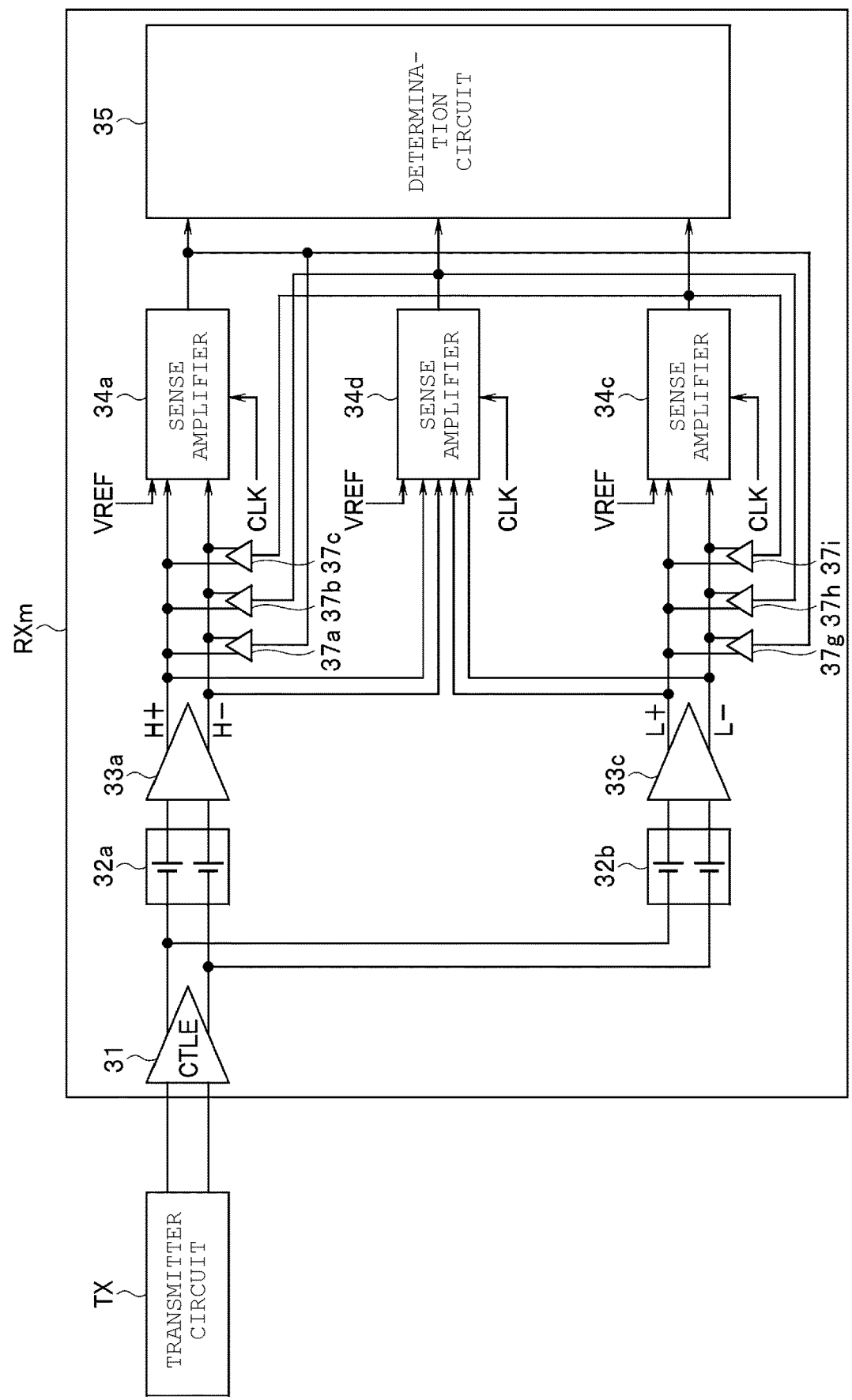
FIG. 15 is a block diagram illustrating an example of a configuration of a receiver circuit according to Modification 4 of the second embodiment.

FIG. 15 is a block diagram illustrating an example of a configuration of a receiver circuit of the Modification 4 of the second embodiment. In FIG. 15, the same configurations as those in FIGS. 9 and 10 are given the same reference numerals, and the description thereof will be omitted. A receiver circuit RXm of FIG. 15 is an example in which the sense amplifier 34d with the interpolation processing function in FIG. 10 is applied to the receiver circuit RXg of FIG. 9.

As illustrated in FIG. 15, in the receiver circuit RXm according to the Modification 4 of the second embodiment, the amplification circuit 33b and the buffer circuits 37d to 37f are removed from the receiver circuit RXg of FIG. 9. The receiver circuit RXm includes the sense amplifier 34d with the interpolation processing function illustrated in FIG. 10 instead of the sense amplifier 34b of the receiver circuit RXg of FIG. 9.

Similar to the second embodiment, the output signals H+ and H− of the amplification circuit 33a and the output signals L+ and L− of the amplification circuit 33c are input to the sense amplifier 34d. The sense amplifier 34d performs the interpolation processing on the signal of the Upper Eye and the signal of the Lower Eye to generate the signal of the Center Eye. Then, the sense amplifier 34d compares the signal of the Center Eye generated by the interpolation processing with the threshold voltage VREF, and outputs the comparison result to the determination circuit 35.

With the configuration described above, similar to the first embodiment, the receiver circuit RXm can appropriately restore data from the signal, and can have a smaller circuit area than that of the receiver circuit RXg of the Modification 4 of the first embodiment.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or the modifications as would fall within the scope and spirit of the disclosure.

What is claimed is:
1. A receiver circuit comprising:
an equalizer configured to process a received signal;
a first offset circuit configured to apply a first offset voltage to the processed signal, the first offset voltage having a first polarity;
a second offset circuit configured to apply a second offset voltage to the processed signal, the second offset voltage having a second polarity opposite to the first polarity;
a first amplification circuit configured to amplify a first output signal provided by the first offset circuit;
a second amplification circuit configured to amplify a second output signal provided by the second offset circuit;
a third amplification circuit configured to amplify the processed signal;
a first comparison circuit configured to compare an output signal of the first amplification circuit with a threshold voltage and provide a first comparison result;
a second comparison circuit configured to compare an output signal of the second amplification circuit with the threshold voltage and provide a second comparison result; and
a third comparison circuit configured to compare an output signal of the third amplification circuit with the threshold voltage and provide a third comparison result.

2. The receiver circuit according to claim 1, wherein
the processed signal includes a plurality of Eyes, each of the Eyes having a different voltage range,
the first offset circuit is configured to apply the first offset voltage to the processed signal, causing a center of an Upper Eye of the processed signal is about 0 V, and
the second offset circuit is configured to apply the second offset voltage to the processed signal, causing a center of a Lower Eye of the processed signal is about 0 V.

3. The receiver circuit according to claim 1, wherein
the first to third comparison results are superimposed on each of the first output signal, the second output signal, and the third output signal.

4. The receiver circuit according to claim 1, wherein
the first offset circuit and the second offset circuit each include one of a voltage source, a buffer circuit, or both of a capacitor and a resistor.

5. The receiver circuit according to claim 1, wherein
when the received signal is a PAM-N signal (N is an integer of 4 or more), (N−1) amplification circuits are provided.

6. The receiver circuit according to claim 1, wherein the receiver circuit is operatively integrated into an interface circuit.

7. A receiver circuit comprising:
an equalizer configured to process a received signal;
a first offset circuit configured to apply a first offset voltage to the processed signal, the first offset voltage having a first polarity;
a second offset circuit configured to apply a second offset voltage to the processed signal, the second offset voltage having a second polarity opposite to the first polarity;
a first amplification circuit configured to amplify a first output signal provided by the first offset circuit;
a second amplification circuit configured to amplify a second output signal provided by the second offset circuit;
a first comparison circuit configured to compare an output signal of the first amplification circuit with a threshold voltage and output a first comparison result;
a second comparison circuit configured to compare an output signal of the second amplification circuit with the threshold voltage and output a second comparison result; and
a third comparison circuit configured to interpolate the output signals of the first and second comparison circuits, compare an interpolation result with the threshold voltage, and output a third comparison result.

8. The receiver circuit according to claim 7, wherein
when the received signal is a PAM-N signal (N is an integer of 4 or more), N/2 amplification circuits are provided.

9. The receiver circuit according to claim 7, wherein the receiver circuit is operatively integrated into an interface circuit.

10. The receiver circuit according to claim 8, wherein the processed signal includes a plurality of Eyes, each of the Eyes having a different voltage range,
the first offset circuit is configured to apply the first offset voltage to the processed signal, causing a center of an Upper Eye of the processed signal is about 0 V, and
the second offset circuit is configured to apply the second offset voltage to the processed signal, causing a center of a Lower Eye of the processed signal is about 0 V.

11. The receiver circuit according to claim 7, wherein
the first and second comparison results are superimposed on each of the output signals of the first and second comparison circuits.

12. The receiver circuit according to claim 7, wherein
the first offset circuit and the second offset circuit each include one of a voltage source, a buffer circuit, or both of a capacitor and a resistor.

13. A method of a receiver circuit, comprising:
applying a first offset voltage to a signal processed by an equalizer, the first offset voltage having a first polarity;
applying a second offset voltage to the processed signal, the second offset voltage having a second polarity opposite to the first polarity;
amplifying the processed signal with the first offset as a first output signal;
amplifying the processed signal with the second offset as a second output signal;
amplifying the processed signal without an offset as a third output signal;
comparing the first output signal with a threshold voltage and providing a first comparison result;
comparing the second output signal with the threshold voltage and providing a second comparison result; and
comparing the third output signal with the threshold voltage and providing a third comparison result.

14. The method according to claim 13, further comprising:
superimposing the first to third comparison results on each of the first output signal, the second output signal, and the third output signal.

15. The method according to claim 13, wherein
each of the first offset circuit and the second offset circuit is applied by one of a voltage source, a buffer circuit, or both of a capacitor and a resistor.

16. The method according to claim 13, wherein
the processed signal includes a plurality of Eyes, each of the Eyes having a different voltage range, the method further comprises:
applying the first offset voltage to the processed signal, causing a center of an Upper Eye of the processed signal is about 0 V, and
applying the second offset voltage to the processed signal, causing a center of a Lower Eye of the processed signal is about 0 V.

* * * * *